United States Patent [19]
Pregeant, Jr. et al.

[11] Patent Number: 5,919,003
[45] Date of Patent: Jul. 6, 1999

[54] MARINE PIPELINE RECOVERY SYSTEM AND METHOD OF RECOVERING MARINE PIPELINE

[75] Inventors: Clyde Pregeant, Jr., Cut Off; Morris Hunter, Galliano; Jeffrey Smith, New Orleans, all of La.

[73] Assignee: Grand Isle Shipyard, Inc., Raceland, La.

[21] Appl. No.: 09/025,293

[22] Filed: Feb. 13, 1998

[51] Int. Cl.⁶ ........................................ F16L 1/04
[52] U.S. Cl. .................. 405/173; 405/158; 405/165; 405/166
[58] Field of Search ................... 405/173, 166, 405/165, 169, 170, 171, 158, 159, 184, 154, 156

[56] References Cited

U.S. PATENT DOCUMENTS

| | | | |
|---|---|---|---|
| 3,685,305 | 8/1972 | Lloyd | 405/166 |
| 3,788,084 | 1/1974 | Matthews, Jr. | |
| 3,842,612 | 10/1974 | Arnold | |
| 3,971,228 | 7/1976 | Silvestri et al. | |
| 4,091,629 | 5/1978 | Gunn et al. | 405/166 X |
| 4,444,528 | 4/1984 | Scodino et al. | 405/173 |
| 4,445,804 | 5/1984 | Abdallah et al. | 405/173 |
| 5,011,333 | 4/1991 | Lanan | 405/173 X |
| 5,044,827 | 9/1991 | Gray et al. | 405/173 |
| 5,282,696 | 2/1994 | Solomon et al. | 405/184 |
| 5,413,434 | 5/1995 | Stenfert et al. | 405/166 |
| 5,580,187 | 12/1996 | Jordan | 405/166 |
| 5,655,753 | 8/1997 | Berges et al. | 254/134.3 SC |

*Primary Examiner*—Dennis L. Taylor
*Attorney, Agent, or Firm*—Kennedy, Davis & Kennedy P.C.

[57] ABSTRACT

A pipeline recovery system (10) is disclosed having a recovery vessel (11) with an upper deck (12) and a pivotal pipeline ramp (13) mounted to the bow of the vessel. The system also includes a pipeline support bed (22) having a middle portion (23), two grated portions (24) straddling the middle portion, and a liquid collection trough (25) coupled to a seawater contaminate separator (26). A pipeline positioning winch (30) is mounted to a rearward end of the pipeline support bed. A length of a pipeline (P) is lifted from the seabed and onto the support bed where it is secured by a pair of clamping arms (40) and a vertical clamp (41), and cut with a pipe shear (42).

22 Claims, 4 Drawing Sheets

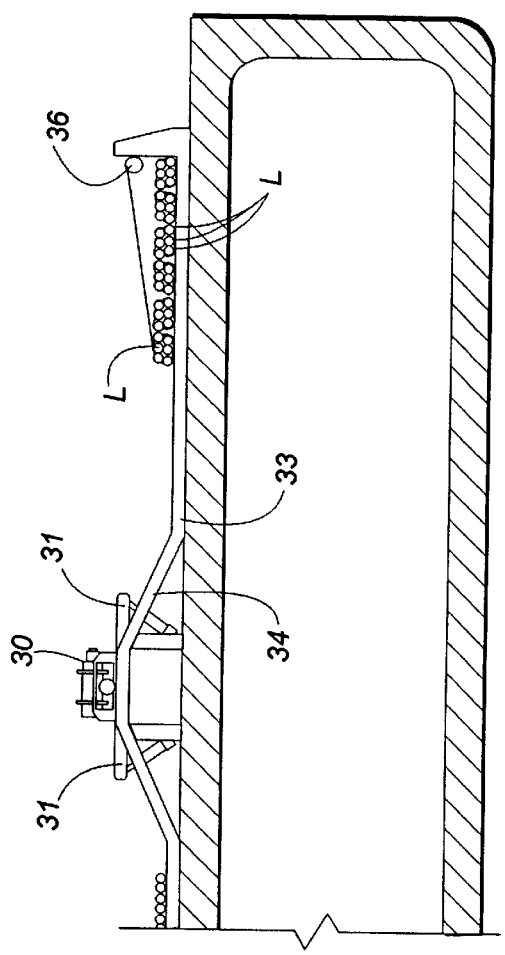
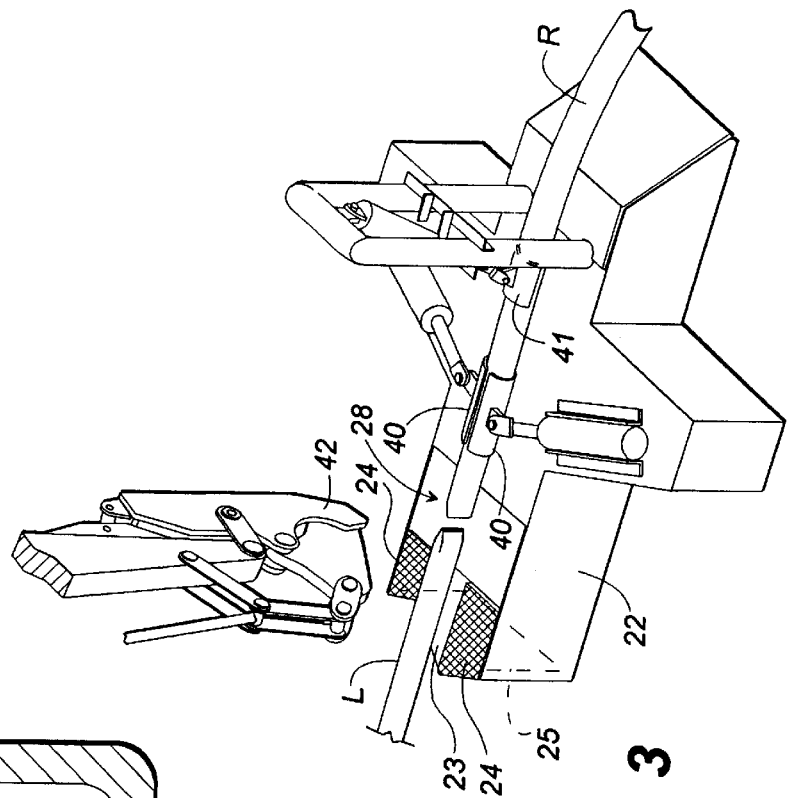
FIG. 2
FIG. 3

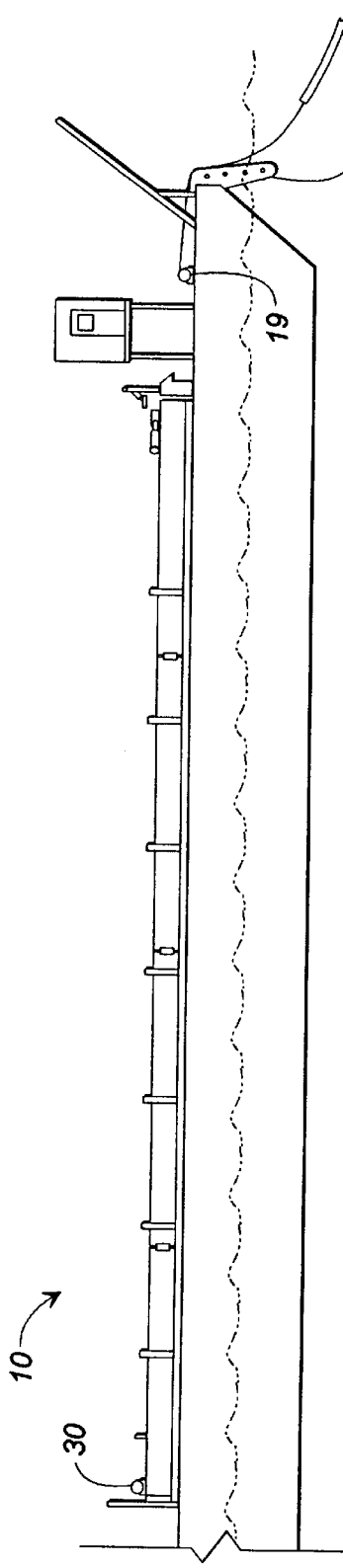
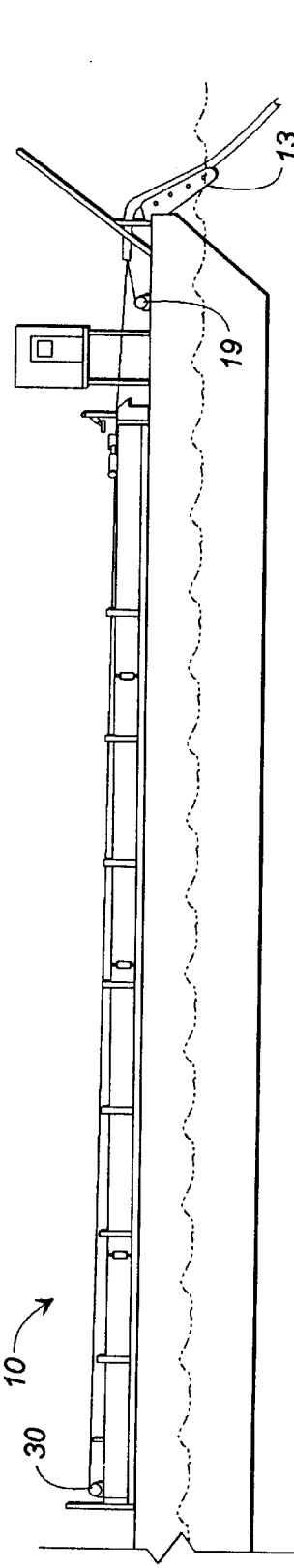
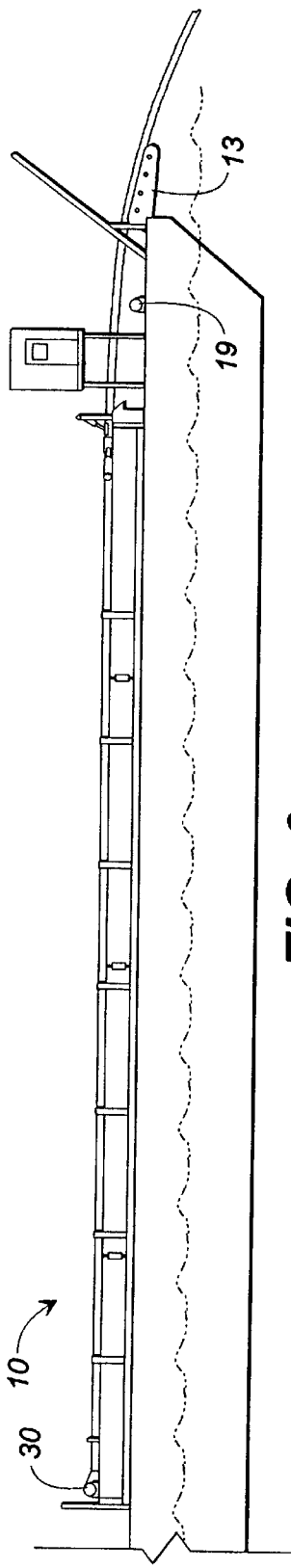
FIG. 4
FIG. 5
FIG. 6

MARINE PIPELINE RECOVERY SYSTEM AND METHOD OF RECOVERING MARINE PIPELINE

TECHNICAL FIELD

This invention relates to systems which recover marine pipeline from the depths of large bodies of water and methods of recovering such pipelines.

BACKGROUND OF THE INVENTION

Today, petroleum such as oil and gas is oftentimes collected from offshore wells. The collected petroleum must be transported to the mainland for ultimate processing and consumption. This transportation may be accomplished by either loading the petroleum aboard tanker vessels or pumping it through submerged pipelines laid upon the seabed. It has been found that the method of transporting petroleum through pipelines is less expensive, more efficient and safer than by tanker vessels.

Prior to 1991 pipelines were oftentimes not buried and thus exposed to hazards such as the dragging anchors of ships. Occasionally, submerged pipelines also become crimped, broken or dangerously deteriorated and thus must be recovered from the sea floor. Also, unburied pipelines are required to be removed from the sea floor shortly after the operational closing of a well or other production stations.

To date, several methods have been employed to recover submerged pipelines. These methods, as described more fully herein, have proved to be costly and/or dangerous. One method of recovering pipelines has involved having divers transported to the sea floor where they then cut the pipeline into sections. The cut sections are then lifted by a crane to a recovery vessel. Because of the limitations upon a diver, this method of recovery may only be accomplished in relatively shallow waters. However, even in shallow waters this method is still dangerous to divers, time consuming and dangerous to the environment as contaminates within the pipeline may be released to the sea. Beyond a diver's depth limitation submersible vehicles may be used which manipulate cutting equipment. However, vehicular operation is even more expensive and time consuming than that previously described and still has the associated problem of releasing contaminates into the water.

As shown in U.S. Pat. No. 3,971,228, another method of recovering pipeline has been to lift the end of a pipeline to the surface of the water alongside a marine vessel. A pair of cranes then support the pipeline while a section of the pipeline is severed. The severed section is then lifted to the deck of the marine vessel. This method of recovering pipeline while significantly decreasing the risk to a diver nevertheless is also time consuming. Additionally, this method is extremely difficult to implement in other than ideal conditions, for the rising and falling of the vessel causes difficulties in holding and cutting the pipeline.

Pipelines have also been winched onto a barge where they are then cut with a torch. This method of retrieving pipelines has associated problems as well. One problem associated with this method has been with regard to the cutting of the pipeline with a torch. As these pipelines have been used to transport oil and gas they oftentimes, even after flushing, contain hydrocarbons which vaporize over time causing the hydrocarbons to be ignited with the torch. Another problem has been the safety to personnel as the pipeline rests upon the deck of the barge during this procedure, for the barge may drift thereby causing the shifting of the pipeline on board or the pipeline may spring or roll upon cutting. Thus, this method while increasing safety by limiting personnel time underwater creates safety problems aboard the vessel.

It thus is seen that a need remains for a system to recover marine pipeline and a method of recovering such in a safe and efficient manner. It is to the provision of such that the present invention is primarily directed.

SUMMARY OF THE INVENTION

In a preferred form of the invention, a marine pipeline recovery system comprises an elongated bed adapted to be mounted to a vessel upon which a length of pipeline may be supported. The elongated bed has a length extending between a forward end and an aft end. The recovery system also has pipeline lifting means for lifting a length of submerged pipeline having a terminated end upon the bed and drawing a length of the pipeline from the forward end toward the aft end of the bed, holding means for holding the bed supported pipeline length at a location along the pipeline distally from the terminated end and adjacent the forward end of the bed, and severing means for severing the pipeline at a location between the holding location and the terminated end of the length of pipeline.

In another preferred form of the invention, a method of recovering marine pipeline from a seabed comprises the steps of pulling a terminated end of the pipeline from the seabed to a recovery vessel, positioning the terminated end of the pipeline adjacent a forward end of a pipeline support mounted to the deck of the recovery vessel, drawing a length of pipeline upon the pipeline support from the forward end to a rearward end of the pipeline support, holding the pipeline at a location distal the terminated end, severing the pipeline between the distal location and the terminated end to form a severed pipeline section from a balance section while simultaneously holding the pipeline along the balance section, and removing the severed section from the pipeline support.

BRIEF DESCRIPTION OF THE DRAWINGS

FIG. 2 is a partial cross-sectional view of a portion of the pipeline recovery system of FIG. 1.

FIG. 3 is a perspective view of a forward end of a pipeline support, a series of pipeline clamps and a pipeline cutter of the pipeline recovery system of FIG. 1.

FIGS. 4–8 are a series of side views of the pipeline recovery system of FIG. 1 which show in sequence the pipeline lifted, positioned upon a support, clamped, cut and moved for storage, shown with some portions of the recovery vessel removed for clarity.

DETAILED DESCRIPTION

Figure 1:
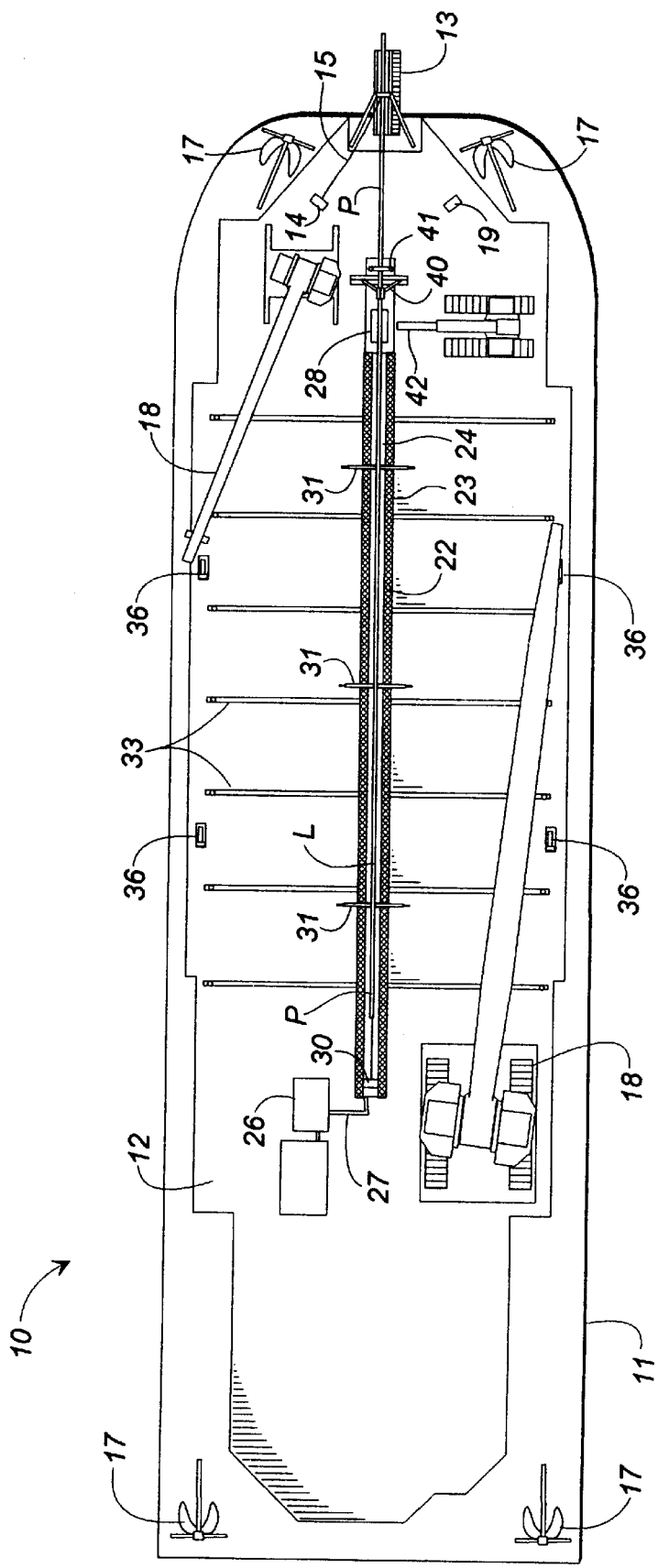
FIG. 1 is a top view of a pipeline recovery system in a preferred embodiment, shown with some portions of the recovery vessel removed for clarity.

With reference next to the drawings, there is shown a pipeline recovery system 10 made in accordance with the present invention. The pipeline recovery system 10 includes a marine recovery vessel 11, in the form of a barge, having an upper deck 12 with a pivotal pipeline ramp or stinger 13 mounted to the upper deck in a position extending over the bow of the vessel. The stinger 13 is coupled to a winch 14 by a cable 15 for actuating pivotal movement of the stinger. The vessel 11 also has four anchors 17, each of which is mounted to a corner of the vessel and having approximately 3,000 feet of anchor line, two loading cranes 18 and a pipeline lifting winch 19.

An elongated, elevated pipeline support bed 22 is mounted to the deck having a length which extends from a forward or fore end adjacent the stinger 13 to a rear or aft end near the stern of the vessel 11. The support bed 22 has a middle portion 23 straddled by two grated portions 24, an opening 28, and a liquid collection conduit or trough 25 extending below the grated portions 24, as best shown in FIG. 3. The collection trough 25 is coupled to a seawater contaminant separator 26 via a conduit 27. A pipeline positioning winch 30 is mounted to the rearward end of the pipeline support bed 22. Three pneumatically pivotal pipe trip arms 31 are mounted to each side of the support bed 22 which extend through the support bed middle and grated portions 23 and 24. Seven pipe support beams 33 for supporting support the pipeline support bed 22 are mounted to the deck 12 of the vessel 11. Each pipe support beam 33 has an off-loading ramp 34 extending from either side of the support bed. Two bundling winches 36 are mounted to each interior side of the vessel 11 or gathering and bundling sections of cut pipeline atop the support beams 33.

As best shown in FIG. 3, a pair of horizontally opposed hydraulic pipe clamping arms 40 and a vertically actuated hydraulic clamp 41 are mounted to the forward end of the support bed 22. A movable hydraulic pipe cutting shear 42, shown mounted to the end of a track-hoe, is also positioned adjacent the forward end of the support bed just inward of the clamping arms 40 and over the opening 28.

In use, the vessel anchors 17 are set by tug boats with the forward anchor lines extended to nearly their full extent and the rear anchor lines extended a relatively short distance. As shown in FIG. 4, the stinger 13 is pivoted to a lower position through the release of cable 15 from winch 14 and the cable of the pipeline lifting winch 19 is passed over the stinger and into the water where it is brought to the sea floor and coupled to the end of the pipeline P to be recovered. Pipeline lifting winch 19 is then actuated to pull the end of the pipeline P to the surface and over the stinger 13. The stinger 13 is then pivoted by winch 14 to an upper position so as to minimize the bending of the pipeline P as it is pulled aboard the vessel. As shown in FIG. 5, the cable of pipeline positioning winch 30 is then coupled to the end of the pipeline P and brought tight, thereby enabling pipeline lifting winch 19 to be disconnected from the pipeline. The pipeline positioning winch 30 is then actuated so as to pull a length of the pipeline P along the length of the pipeline support bed middle portion 23 in a direction from its forward end to a position with the end of the pipeline adjacent the rearward end of the support bed, as shown in FIG. 6.

Figure 7:
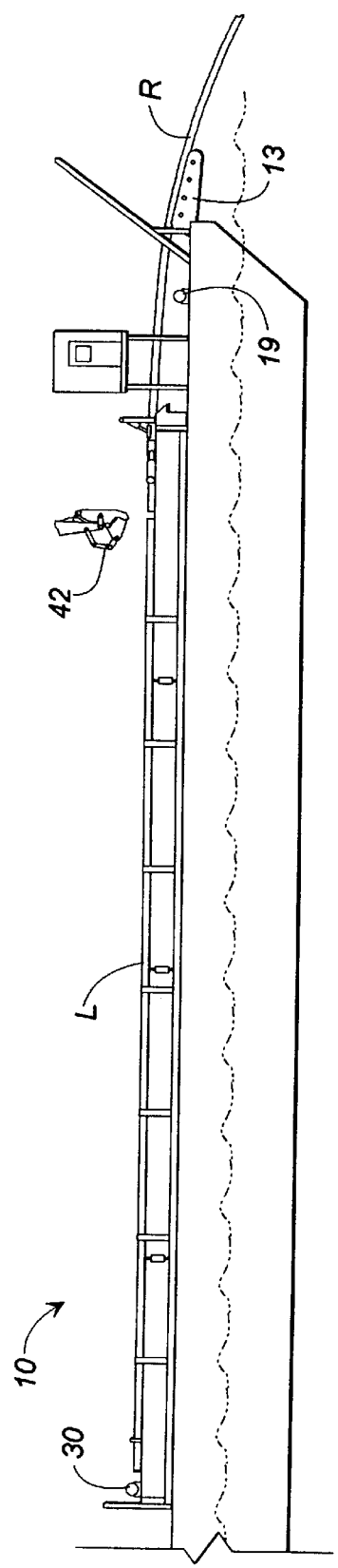
Figure 8:
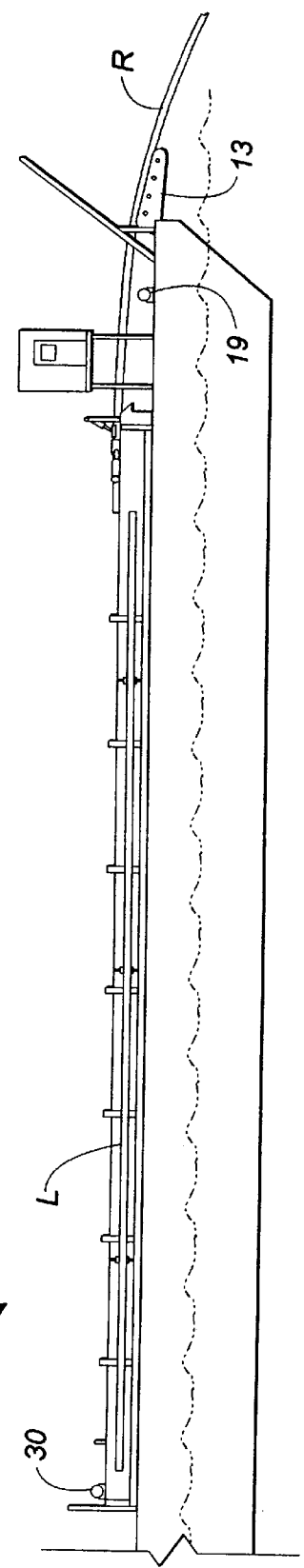

Once the pipeline P is positioned upon the support bed 22, the clamping arms 40 are brought together and the hydraulic clamp 41 lowered to secure the pipeline to the forward end of the support bed 22. The pipe cutting shear 42 is then positioned about the pipeline above the opening 28 just inward of the clamping arms and actuated, thereby severing a length of pipe L from the remaining pipeline R, as shown in FIG. 7. Any expelled liquid from the pipeline flows through opening 28 and into the liquid collection trough or is expelled onto the pipeline support bed 22 where it passes through the grated portions 24 and into the liquid collection trough 25, where it is then conveyed through conduit 27 to the seawater contaminate separator 26. The separator 26 separates contaminates from the seawater, stores the contaminates and returns the treated seawater to the sea. The cable of the pipeline positioning winch 30 is then disconnected from the end of the pipeline L. The three pneumatic pipe trip arms 31 on the desired side of a pipe storage area, defined by support beams 33, are then pivoted upwards from the support bed 22 causing the severed length of pipe L to roll down the off-loading ramps 34 and onto the main portion of the support beams 33, as shown in FIG. 8.

With the remaining pipeline R still secured by clamping arms 40 and clamp 41, the cable of the pipeline positioning winch 30 is coupled to the newly formed end of the remaining pipeline R. The pipeline positioning winch 30 is then reattached to the newly formed terminated end of the pipeline. The pipeline clamping arms 40 and clamp 41 are actuated to release the remaining pipeline R, the remaining pipeline R is then pulled along the pipeline supporting bed 22 by the pipe positioning winch 30, re-clamped by clamps 40 and 41, and severed by shears 42, similarly to that previously described with reference to FIGS. 5–8. This procedure is repeated until the pipeline is completely recovered from the sea floor or the procedure is temporarily halted. The severing of the pipeline with the shears 42 causes the end of the pipeline to be pinched shut substantially. However, to ensure unwanted leakage from the pipeline during storage a seal may be placed upon the ends of the pipeline.

With each pulling of the remaining pipeline R along the support bed 22 and the release of tension from the rearward anchors 17, the vessel 11 is allowed to travel forward by the pulling force applied to the pipeline, much like a cable action ferry, or assisted by the pushing force of tug boats against the vessel or engine power of its own if so equipped. The forward anchor lines are reeled tight while the pipeline is pulled onto the vessel to insure the proper anchoring of the vessel.

Occasionally, it may be desired to bundle several lengths of pipes together for storage. To do so, the cables of bundling winches 36 are wrapped about several lengths of pipes and then pulled tight, as shown in FIG. 2. The gathered pipes are then tied together with a length of rope and the winch cables released. Once the pipeline is fully recovered or the pipeline storage areas filled, the bundles of pipes are off-loaded from the vessel by the cranes 18.

The just described system with a support bed of a length to support cut pipe sections measuring 110 feet can process approximately 500 feet of pipeline per hour.

It should be understood that as an alternative to the preferred embodiment, the pipeline may be cut with a blade or a torch, even though a torch is not preferred because of the previously described problems associated with hydrocarbons within the pipeline. Also, many types of conventionally known pipeline clamps may be used to secure the position of the pipe upon the support bed. Additionally, as an alternative to utilizing a first winch to pull the pipeline from the sea floor and a second winch to pull the pipeline along the support bed, a system having a single winch to accomplish both tasks may be used. Lastly, the terms forward, fore, rearward and aft are use herein primarily in reference to the movement of the pipeline and not the actual position of the vessel as the pipeline may be drawn from the stern of the vessel towards the bow of the vessel, even though this is not preferred.

From the foregoing, it is seen that a new system for recovering marine pipeline and a method of doing so is now provided which overcome problems associated with those of the prior art. It should however be understood that the just described system and method merely illustrate principles of the invention in preferred forms. Many modifications, additions and deletions may, of course, be made thereto without departure from the spirit and scope of the invention as set forth in the following claims.

We claim:

1. A marine pipeline recovery system comprising:

an elongated bed adapted to be mounted to a vessel upon which a length of pipeline may be supported, said elongated bed having a length extending between a forward end and an aft end;

pipeline lifting means for lifting a length of submerged pipeline having a terminated end upon said bed and drawing a length of the pipeline from said forward end toward said aft end of said bed;

holding means for holding the bed supported pipeline length at a location along the pipeline distally from the terminated end and adjacent said forward end of said bed; and severing means for severing the pipeline at a location between the holding location and the terminated end of the length of pipeline.

2. The marine pipeline recovery system of claim 1 wherein said holding means comprises a pair of clamping arms which grasp the pipeline therebetween.

3. The marine pipeline recovery system of claim 1 further comprising a liquid recovery conduit extending along a portion of said bed.

4. The marine pipeline recovery system of claim 3 further comprising a contaminate separator coupled to said liquid recovery conduit which separates contaminates from seawater.

5. The marine pipeline recovery system of claim 1 further comprising a pipeline storage area and pipeline moving means for moving the pipeline from said pipeline supporting bed to said pipeline storage area.

6. The marine pipeline recovery system of claim 1 wherein said pipeline lifting means comprises a first winch which pulls the pipeline to said bed and a second winch which pulls the pipeline along the length of said bed.

7. The marine pipeline recovery system of claim 1 wherein said severing means is a pipe shearer.

8. The marine pipeline recovery system of claim 1 wherein said holding means comprises a hydraulic clamp.

9. A marine pipeline recovery system comprising:

a marine vessel having an elongated pipeline supporting bed having a length extending between a forward end adjacent one end of said vessel and an aft end adjacent the opposite end of said vessel;

a winch system adapted to lift a length of submerged pipeline having a terminated end to said vessel and to draw the length of pipeline upon said pipeline supporting bed from said forward end to a position adjacent said aft end;

a clamp adapted to hold the pipeline at a location distally from the pipeline terminated end;

a pipeline cutter adapted to cut the pipeline at a location between the pipeline terminated end and the clamp holding location.

10. The marine pipeline recovery system of claim 9 wherein said winch system comprises a first winch which pulls the pipeline to a position adjacent said pipeline supporting bed and a second winch which pulls the pipeline along said pipeline supporting bed.

11. The marine pipeline recovery system of claim 9 further comprising a liquid recovery conduit extending along a portion of said pipeline supporting bed.

12. The marine pipeline recovery system of claim 9 wherein said marine vessel has a pipeline storage area and wherein said marine pipeline recovery system further comprises pipeline moving means for moving the pipeline from said pipeline supporting bed to said pipeline storage area.

13. The marine pipeline recovery system of claim 11 further comprising a contaminate separator coupled to said liquid recovery conduit which separates contaminates from seawater.

14. The marine pipeline recovery system of claim 9 wherein said clamp has a pair of clamping arms which grasps the pipeline therebetween.

15. The marine pipeline recovery system of claim 14 further comprising a hydraulic arm which captures the pipeline between said arm and said pipeline support bed.

16. The marine pipeline recovery system of claim 9 wherein said clamp is a hydraulic arm which captures the pipeline between said arm and said pipeline support bed.

17. A method of recovering marine pipeline from a seabed comprising the steps of:

(a) pulling a terminated end of the pipeline from the seabed to a recovery vessel and positioning the terminated end of the length of pipeline to a position adjacent a forward end of a pipeline support mounted to the deck of the recovery vessel;

(b) drawing the length of pipeline upon the pipeline support from the forward end to a rearward end of the pipeline support;

(c) holding the pipeline at a location distal the terminal end;

(d) severing the pipeline between the distal location and the terminal end to form a severed pipeline section from a balance pipeline section, while simultaneously holding the balance pipeline; and (e) removing the severed pipeline section from the pipeline support.

18. The method of claim 17 wherein steps (b) through (e) are repeated along the pipeline balance section.

19. The method of claim 17 wherein step (b) the positioning of the length of pipeline causes forward movement of the recovery vessel.

20. The method of claim 17 wherein step (d) the severing of the pipeline substantially closes the severed end of the severed pipeline section.

21. The method of claim 17 further comprising step (f) capturing contaminated liquid expelled from the pipeline.

22. The method of claim 21 further comprising step (g) conveying the captured contaminated liquid to a separator and separating contaminates from the liquid.

* * * * *